US010538650B2

(12) United States Patent
Adkinson et al.

(10) Patent No.: US 10,538,650 B2
(45) Date of Patent: Jan. 21, 2020

(54) BUTYL IONOMER BLENDS

(71) Applicant: ARLANXEO Singapore Pte. Ltd., Singapore (SG)

(72) Inventors: Dana K. Adkinson, London (CA); Jon Bielby, Wyoming (CA)

(73) Assignee: ARLANXEO SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 15/504,354

(22) PCT Filed: Aug. 11, 2015

(86) PCT No.: PCT/CA2015/050758
§ 371 (c)(1),
(2) Date: Feb. 16, 2017

(87) PCT Pub. No.: WO2016/026037
PCT Pub. Date: Feb. 25, 2016

(65) Prior Publication Data
US 2017/0233563 A1    Aug. 17, 2017

(30) Foreign Application Priority Data

Aug. 22, 2014 (EP) .................................... 14181965

(51) Int. Cl.
| | |
|---|---|
| *C08L 23/06* | (2006.01) |
| *C08L 23/04* | (2006.01) |
| *C08J 3/00* | (2006.01) |
| *C08L 77/02* | (2006.01) |

(52) U.S. Cl.
CPC ............... *C08L 23/06* (2013.01); *C08J 3/005* (2013.01); *C08L 23/04* (2013.01); *C08L 77/02* (2013.01); *C08J 2323/06* (2013.01); *C08J 2377/02* (2013.01); *C08J 2409/00* (2013.01); *C08L 2207/04* (2013.01); *C08L 2207/062* (2013.01); *C08L 2207/066* (2013.01)

(58) Field of Classification Search
None
See application file for complete search history.

(56) References Cited

U.S. PATENT DOCUMENTS

| | | | | |
|---|---|---|---|---|
| 4,098,463 | A | * | 7/1978 | Lowry .................. B02C 18/148 241/17 |
| 4,162,241 | A | * | 7/1979 | Canter .................... C08L 27/06 524/157 |
| 4,399,064 | A | | 8/1983 | Penneck |
| 6,359,071 | B1 | | 3/2002 | Watananbe et al. |
| 7,446,151 | B2 | | 11/2008 | Resendes et al. |
| 9,273,154 | B2 | | 3/2016 | Kreuder et al. |
| 9,815,929 | B2 | | 11/2017 | Siegers et al. |
| 2015/0218357 | A1 | | 8/2015 | Feng |

FOREIGN PATENT DOCUMENTS

| | | |
|---|---|---|
| CN | 102395631 A | 3/2012 |
| CN | 103348493 A | 10/2013 |
| CN | 103665407 A | 3/2014 |
| EP | 0350289 A2 | 1/1990 |
| RU | 2265613 C2 | 12/2005 |
| RU | 2459837 C2 | 8/2012 |
| WO | 2009155190 A2 | 12/2009 |
| WO | 2012100760 A1 | 8/2012 |

OTHER PUBLICATIONS

Morton, Maurice (editor), Butyl and Halobutyl Rubbers, Rubber Technology, Third Edition, 1987, Van Nostrand Reinhold Company, pp. 297-300.
Parent, J. Scott, et al., "Ion-Dipole Interaction Effects in Isobutylene-based Ammonium Bromide Ionomers", Journal of Polymer Science Part A: Polymer Chemistry, vol. 43, pp. 5671-5679.
Parent, J. Scott, et al., "Isobutylene-based ionomer composites: siliceous filler reinforcement", Polymer 45, 2004, Elsevier, pp. 8091-8096.
Parent J. Scott, et al., "Synthesis and Characterization of Isobutylene-Based Ammonium and Phosphonium Bromide Ionomers", Macrocolecules 2004, 37, pp. 7477-7483.
Othmer, Encyclopedia of Polymer Science and Engineering, vol. 4, Composites, Fabrication to Die Design, Compounding, John Wiley & Sons, 1986, pp. 66-79.
Supplementary European Search Report from European Application No. 15834185, dated Feb. 27, 2018, two pages.
International Search Report from International Application No. PCT/CA2015/050758, dated Dec. 7, 2015, two pages.
Encyclopedia of Chemical Technology, Resin and Plastic Professional Volume, Volumes One and Two; Chemical Industry Press; Jan. 31, 2003; p. 1603.
Wen, Bianying, Polymer Materials and Processing; China Light Industry Press; Mar. 31, 2005, p. 180.
Wang, Yunqin, China Synthetic Resin and Plastic; A New Material Nylon 61, vol. 81, No. 71, pp. 68-73.
"Rubber Technology" (Third Edition) by Maurice Morton, Chapter 10 (Van Nostrand Reinhold Company © 1987), particularly pp. 297-300.
Handbook of Thermoplastic Elastomers, Encyclopedia of Polymer Science and Engineering, vol. 4, p. 66 et seq(Compounding), 2007.

\* cited by examiner

*Primary Examiner* — Ana L. Woodward
(74) *Attorney, Agent, or Firm* — The Dobrusin Law Firm, P.C.

(57) ABSTRACT

A polymeric compound involves a blend of 50 wt % or greater of a thermoplastic having an average melting point ($T_m$) of less than 200 ° C. and less than 50 wt % of a butyl rubber ionomer dispersed in a matrix of the thermoplastic, weights based on total weight of the thermoplastic and butyl rubber ionomer. Such blends may exhibit improved physical properties compared to unblended thermoplastic, particularly ultimate elongation and/or damping. The polymeric compounds are useful for forming a variety of articles of manufacture.

20 Claims, 3 Drawing Sheets

BUTYL IONOMER BLENDS

FIELD

This application relates to polymers, particularly to butyl rubber ionomers blended with other polymers.

BACKGROUND

Poly(isobutylene-co-isoprene) or IIR, is a synthetic elastomer commonly known as butyl rubber (or Butyl polymer) which has been prepared since the 1940's through the random cationic copolymerization of isobutylene with small amounts of isoprene (usually not more than 2.5 mol %). As a result of its molecular structure, IIR possesses superior air impermeability, a high loss modulus, oxidative stability and extended fatigue resistance.

Halogenation of butyl rubber produces reactive allylic halide functionality within the elastomer. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company © 1987), particularly pp. 297-300.

The development of halogenated butyl rubber (halobutyl) has greatly extended the usefulness of butyl by providing much higher curing rates and enabling co-vulcanization with general purpose rubbers such as natural rubber and styrene-butadiene rubber (SBR). Butyl rubber and halobutyl rubber are high value polymers, as their unique combination of properties (excellent impermeability, good flex, broad damping characteristics, good weatherability, heat resistance, chemical resistance, biocompatibility, co-vulcanization with high unsaturation rubbers, in the case of halobutyl) make them preferred materials for various applications, such as their use in making tire inner tubes and tire inner liners.

The presence of allylic halide functionalities allows for nucleophilic alkylation reactions. It has been shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. Journal of Polymer Science, Part A: Polymer Chemistry 43, 5671-5679, 2005; Parent, J . S.; Liskova, A.; Resendes, R. Polymer 45, 8091-8096, 2004 ; Parent, J. S. ; Penciu, A. ; Guillen-Castellanos, S . A.; Liskova, A.; Whitney, R. A. Macromolecules 37, 7477-7483, 2004). The ionomer functionality is generated from the reaction of a nitrogen or phosphorus based nucleophile and the allylic halide sites in the halogenated butyl rubber to produce an ammonium or phosphonium ionic group respectively. In addition to benefits derived from the butyl rubber, butyl rubber ionomers are also more easily formed into pellets and have enhanced green strength.

Thermoplastics are materials which contain physical, thermoreversible networks imparting excellent physical properties and are widely used in a variety of applications. For example, polyethylenes have good impact resistance, light weight, high tensile strength, good resistance to chemicals, low moisture absorption, ease of processing (e.g. injection moldable) and are FDA approved for direct contact. Polyethylenes are used in detergent, milk and juice bottles, cutting boards, water pipes, molded plastic cases and garden furniture, among others. Polyamides have good durability, high elongation, excellent abrasion resistance, good impact resistance, antimicrobial properties, and good resistance to chemicals. Polyamides are used in rope, fibers, carpets, sports equipment, bristles, low strength machine parts, seat belts and tire cords, among others. Polypropylene has light weight, high tensile strength, excellent abrasion resistance, good impact resistance, good resistance to chemicals and is sterilized using autoclaves. Polypropylene is used in plastic pressure pipe systems, storage containers, bottle caps, appliances (e.g. kettles), car fenders (bumpers) and diapers, among others.

However, despite the success of thermoplastics, there remains a need for improving one or more of the properties of thermoplastics.

SUMMARY

There is provided a polymeric compound comprising a blend of 50 wt % or greater of a thermoplastic having an average melting point ($T_m$) of less than 300° C. and less than 50 wt % of a butyl rubber ionomer dispersed in a matrix of the thermoplastic, percentage weight is based on total weight of the thermoplastic and butyl rubber ionomer.

There is also provided a process for producing a polymeric compound comprising blending 50 wt % or greater of a thermoplastic having an average melting point ($T_m$) of less than 300° C. with less than 50 wt % of a butyl rubber ionomer at a temperature of less than 300° C. to disperse the butyl rubber ionomer in a matrix of the thermoplastic, weights based on total weight of the thermoplastic and butyl rubber ionomer.

There is also provided an article of manufacture comprising the polymeric compound.

Polymeric compounds comprising a blend of 50 wt % or greater of a thermoplastic having an average melting point ($T_m$) of less than 300° C. and less than 50 wt % of a butyl rubber ionomer may exhibit improved physical properties compared to unblended thermoplastic, particularly ultimate elongation and/or damping.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which.

DETAILED DESCRIPTION

Figure 1A:
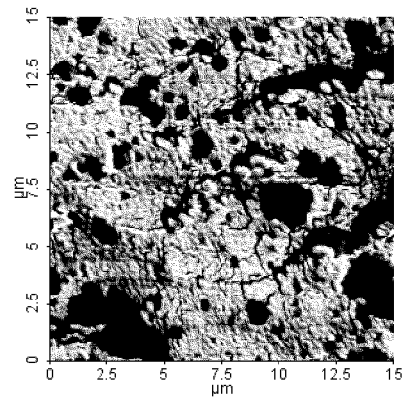
FIG. 1A is an atomic force microscope (AFM) image of a blend of high density polyethylene (LDPE) and butyl rubber ionomer mixed at 130° C. showing domains of butyl ionomer(dark regions) dispersed in a LDPE matrix (light regions).

The polymeric compound comprises a blend of 50 wt % or greater of a thermoplastic and less than 50 wt % of a butyl rubber ionomer dispersed in a matrix of the thermoplastic, based on total weight of the thermoplastic and butyl rubber ionomer. Preferably, the blend comprises 51-99 wt % of the thermoplastic and 1-49 wt % of the butyl rubber ionomer. More preferably, the blend comprises 75-99 wt % of the thermoplastic and 1-25 wt % of the butyl rubber ionomer. Even more preferably, the blend comprises 80-95 wt % of the thermoplastic and 5-20 wt % of the butyl rubber ionomer. For example, the blend may comprise 85-90 wt % of the thermoplastic and 10-15 wt % of the butyl rubber ionomer.

The butyl rubber ionomer is preferably dispersed in the matrix of thermoplastic as domains of butyl rubber ionomer having an average diameter of about 5 μm or less, preferably about 2 μm or less. The average diameter may be as low as 0.1 μm or lower. The average diameter may be in a range of 0.1-5 μm or 0.1-2 μm. The butyl rubber ionomer may be sufficiently dispersed in the thermoplastic that a compatibilizer for compatibilizing the butyl rubber ionomer and thermoplastic may not be required.

Ultimate elongation of the polymeric compounds, as measured by ASTM D412, may be over 1.25 times greater, over 1.5 times greater, over 1.75 times greater, over 2 times greater, or even over 5 times greater, than ultimate elongation of unblended thermoplastic. Damping ability of polymeric compounds of the present invention, as measured by GABO Eplexor® 150N, may be over 1.25 times greater, over 1.5 times greater, over 1.75 times greater, over 2 times greater, over 2.5 times greater, or even over 3 times greater, than damping ability of unblended thermoplastic.

Thermoplastic

A thermoplastic is a polymer which becomes pliable or moldable above a specific temperature and returns to a solid state upon cooling. Thermoplastics for blending with butyl rubber ionomers have average melting points ($T_m$) of less than 300° C., preferably 250° C. or less, more preferably 200° C. or less and even more preferably 185° C. or less. Examples of thermoplastics include polyolefins, polyvinylics, polystyrenics, polyacrylonitrilics, polyacrylics, polyamides, polyurethanes, polyesters, polysiloxane, polyvinylchlorines, polystyrene and the like. Polyolefins, polyamides and polyvinylidene fluoride are preferred. Polyvinylidene fluoride has a $T_m$ of 155-185° C. Some examples of polyolefins include polyethylenes, polypropylenes (PP, $T_m$ of 165-175° C.), polybutylenes (PBI). Some examples of polyethylenes include low density polyethylene (LDPE, $T_m$ of 85-125° C.), high density polyethylene (HDPE, $T_m$ of 130-140° C.), linear low density polyethylene (LLDPE) and ultra high molecular weight polyethylene (UHMWPE). Some examples of polyamides are nylon 6,12 ($T_m$ of 130-140° C.) and nylon 12 ($T_m$ of 160-210° C.)

Butyl Rubber Ionomer

The butyl rubber ionomer may be prepared from a halogenated butyl rubber polymer. The halogenated butyl rubber polymer may be prepared from a butyl rubber polymer. The butyl rubber polymer may be a copolymer derived from at least one isoolefin monomer and at least one multiolefin monomer and/or β-pinene, and optionally one or more further copolymerizable monomers.

Suitable isoolefin monomers include hydrocarbon monomers having 4 to 16 carbon atoms. In one embodiment, isoolefins have from 4-7 carbon atoms. Examples of suitable isoolefins include isobutene (isobutylene), 2-methyl-1-butene, 3-methyl-1-butene, 2-methyl-2-butene, 4-methyl-1-pentene, 4-methyl-1-pentene and mixtures thereof. A preferred isoolefin monomer is isobutene (isobutylene).

Multiolefin monomers copolymerizable with the isoolefin monomers may include dienes, for example conjugated dienes. Particular examples of multiolefin monomers include those having in the range of from 4-14 carbon atoms. Examples of suitable multiolefin monomers include isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 4-butyl-1,3-pentadiene, 2,3-dimethyl-1,3-pentadiene, 2,3-dibutyl-1,3-pentadiene, 2-ethyl-1,3-pentadiene, 2-ethyl-1,3-butadiene, 2-methyl-1,6-heptadiene, cyclopentadiene, methylcyclopentadiene, cyclohexadiene, 1-vinyl-cyclohexadiene and mixtures thereof. A particularly preferred conjugated diene is isoprene. β-pinene may also be used instead of or in addition to the multiolefin monomer. Herein multiolefin/β-pinene monomers refer to the presence or use of one or more multiolefin monomers and/or β-pinene monomer.

The butyl rubber polymer may optionally include one or more additional copolymerizable monomers along with the isoolefin and multiolefin/β-pinene monomers. Additional copolymerizable monomers include monomers copolymerizable with the isoolefin and/or multiolefin/β-pinene monomers. Suitable copolymerizable monomers include, for example, styrenic monomers, such as alkyl-substituted vinyl aromatic co-monomers, including but not limited to a $C_1$-$C_4$ alkyl substituted styrene. Specific examples of copolymerizable monomers include, for example, a-methyl styrene, p-methyl styrene, chlorostyrene, cyclopentadiene and methylcyclopentadiene. In one embodiment, the butyl rubber polymer may comprise random copolymers of isobutylene, isoprene and p-methyl stryene.

The butyl rubber polymers are formed from a mixture of monomers described herein. In one embodiment, the monomer mixture comprises from about 80% to about 99% by weight of an isoolefin monomer and from about 1% to 20% by weight of a multiolefin/β-pinene monomer. In another embodiment, the monomer mixture comprises from about 85% to about 99% by weight of an isoolefin monomer and from about 1% to 15% by weight of a multiolefin/β-pinene monomer. In certain embodiments, three monomers may be employed. In these embodiments, the monomer mixture may comprise about 80% to about 99% by weight of isoolefin monomer, from about 0.5% to about 5% by weight of a multiolefin/β-pinene monomer, and from about 0.5% to about 15% by weight a third monomer copolymerizable with the isoolefin and/or multiolefin/β-pinene monomers. In one embodiment, the monomer mixture comprises from about 68% to about 99% by weight of an isoolefin monomer, from about 0.5% to about 7% by weight of a multiolefin/β-pinene monomer and from about 0.5% to about 25% by weight of a third monomer copolymerizable with the isoolefin and/or multiolefin/β-pinene monomers.

The butyl rubber polymer may be prepared by any suitable method, of which several are known in the art. For example, the polymerization of monomers may be performed in the presence of $AlCl_3$ and a proton source and/or cationogen capable of initiating the polymerization process. A proton source includes any compound that will produce a proton when added to $AlCl_3$ or a composition containing $AlCl_3$. Protons may be generated from the reaction of $AlCl_3$ with proton sources such as water, alcohol or phenol to produce the proton and the corresponding by-product. Such reaction may be preferred in the event that the reaction of the proton source is faster with the protonated additive as compared with its reaction with the monomers. Other proton generating reactants include thiols, carboxylic acids, and the like. The most preferred proton source is water. The preferred ratio of $AlCl_3$ to water is between 5:1 to 100:1 by weight. It may be advantageous to further introduce $AlCl_3$ derivable catalyst systems, diethylaluminium chloride, ethylaluminium chloride, titanium tetrachloride, stannous tetrachloride, boron trifluoride, boron trichloride, or methylalumoxane. Inert solvents or diluents known to the person skilled in the art for butyl polymerization may be considered as the solvents or diluents (reaction medium). These include alkanes, chloroalkanes, cycloalkanes or aromatics, which are frequently also mono- or polysubstituted with halogens. Hexane/chloroalkane mixtures, methyl chloride, dichloromethane or the mixtures thereof may be preferred. Chloroalkanes are preferably used. The monomers are generally polymerized cationically, preferably at temperatures in the range from −120° C. to +20° C., preferably in the range from −100° C. to −20° C., and pressures in the range from 0.1 to 4 bar.

The butyl polymer may also be produced via a solution process as outlined in WO2011089083 A1 and references therein. A C6 solvent is a particularly preferred choice for use in a solution process. C6 solvents suitable for use in the present invention preferably have a boiling point of between 50° C. and 69° C. Examples of preferred C6 solvents include n-hexane or hexane isomers, such as 2-methyl pentane or 3-methyl pentane, or mixtures of n-hexane and such isomers as well as cyclohexane.

The butyl rubber polymer may comprise at least 0.5 mol % repeating units derived from the multiolefin/β-pinene monomers. In some embodiments, the repeating units derived from the multiolefin/β-pinene monomers may be present in the butyl rubber polymer in an amount of at least 0.75 mol %, or at least 1.0 mol %, or at least 1.5 mol %, or at least 2.0 mol %, or at least 2.5 mol %, or at least 3.0 mol %, or at least 3.5 mol %, or at least 4.0 mol %, or at least 5.0 mol %, or at least 8.0 mol %, or at least 10.0 mol %. In one embodiment, the butyl rubber polymer may comprise from 0.5 to 2.2 mol % of the multiolefin/β-pinene monomers. In another embodiment, the butyl rubber polymer may comprise higher multiolefin/β-pinene monomer content, e.g. 3.0 mol % or greater. The preparation of suitable high multiolefin/β-pinene butyl rubber polymers is described in Canadian Patent Application 2,418,884, which is incorporated herein by reference.

In one embodiment, the halogenated butyl rubber polymer may be obtained by first preparing a butyl rubber polymer from a monomer mixture comprising one or more isoolefins, and one or more multiolefins and/or β-pinene, followed by subjecting the resulting copolymer to a halogenation process to form the halogenated butyl rubber polymer. Halogenation can be performed according to the process known by those skilled in the art, for example, the procedures described in Rubber Technology, 3rd Ed., Edited by Maurice Morton, Kluwer Academic Publishers, pp. 297-300 and further documents cited therein. Halogenation may involve bromination and/or chlorination. Brominated butyl rubber polymers may be of particular note. For example, a brominated butyl rubber comprising isobutylene and less than 2.2 mole percent isoprene is commercially available from LANXESS Deutschland GmbH and sold under the name BB2030™.

In the halogenated butyl rubber polymers one or more of the repeating units derived from the multiolefin monomers comprise an allylic halogen moiety. During halogenation, some or all of the multiolefin and/or β-pinene content of the copolymer is converted to units comprising allylic halides. These allylic halide sites in the halobutyl rubber polymer result in repeating units derived from the multiolefin monomers and/or β-pinene originally present in the butyl rubber polymer. The total allylic halide content of the halogenated butyl rubber polymer cannot exceed the starting multiolefin and/or β-pinene content of the parent butyl rubber polymer, however residual allylic halides and/or residual multiolefins may be present. The allylic halide sites allow for reacting with and attaching one or more nucleophiles to the halobutyl rubber polymer. The halogenated butyl rubber polymer may have a total allylic halide content from 0.05 to 2.0 mol %. The halogenated butyl rubber polymer may also contain residual multiolefin levels ranging from 0.2 to 10 mol %.

The butyl rubber ionomers may be obtained by reacting a halogenated butyl rubber polymer with a nucleophile having no pendant vinyl group, a nucleophile comprising a pendant vinyl group or a mixture thereof. The halogenated rubber polymer may be reacted first with a nucleophile having no pendant vinyl group and then with a nucleophile having a pendant vinyl group.

Nucleophiles suitable for the preparation of the butyl rubber ionomers may contain at least one neutral phosphorus or nitrogen center, which possess a lone pair of electrons, the lone pair being both electronically and sterically accessible for participation in nucleophilic substitution reactions. The butyl rubber ionomers obtained from such nucleophiles would comprise phosphorus-based or nitrogen-based ionic moieties.

In one embodiment, the allylic halide sites of the halogenated butyl rubber polymers are reacted with nucleophiles (with or without a pendant vinyl group) having of formula (I):

wherein,

A is a nitrogen or phosphorus; and, $R_1$, $R_2$ and $R_3$ are independently: a vinyl group, a linear or branched $C_1$-$C_{18}$ alkyl group; a linear or branched $C_1$-$C_{18}$ alkyl group comprising one or more hetero atoms selected from the group consisting of O, N, S, B, Si and P;

$C_6$-$C_{10}$ aryl group; $C_3$-$C_6$ heteroaryl group; $C_3$-$C_6$ cycloalkyl group; $C_3$-$C_6$ heterocycloalkyl group; or combinations thereof. If the nucleophile has a pendant vinyl group, the vinyl group may be one of $R_1$, $R_2$ or $R_3$ or could be pendant from one or more of the $R_1$, $R_2$ or $R_3$ groups. Two or all three of the $R_1$, $R_2$ and $R_3$ moieties may be fused together.

Suitable nucleophiles include, but are not limited to trimethylamine, triethylamine, triisopropylamine, tri-n-butylam ine, trimethylphosphine, triethylphosphine, triisopropylphosphine, tri-n-butylphosphine, triphenylphosphine, diphenylphosphinostyrene, allyldiphenylphosphine, diallylphenylphosphine, diphenylvinylphosphine, triallylphosphine, 2-dimethylaminoethanol, 1-dimethylamino-2-propanol, 2-(isopropylam ino)ethanol, 3-dimethylamino-1-propanol, N-methyldiethanolamine, 2-(diethylam ino) ethanol, 2-dimethylamino-2-methyl-1-propanol, 2-[2-(dimethylamino)ethoxy]ethanol, 4-(dimethylamino)-1-butanol, N-ethyldiethanolamine, triethanolamine, 3-diethylamino-1-propanol, 3-(diethylamino)-1,2-propanediol, 2-{[2-(dimethylamino)ethyl]methylamino}ethanol, 4-diethylamino-2-butyn-1-ol, 2-(diisopropylamino)ethanol, N-butyldiethanolamine, N-tert-butyldiethanolamine, 2-(methylphenylamino)ethanol, 3-(dimethylamino)benzyl alcohol, 2-[4-(dimethylamino)phenyl]ethanol, 2-(N-ethylanilino)ethanol, N-benzyl-N-methylethanolamine, N-phenyldiethanolamine, 2-(dibutylamino)ethanol, 2-(N-ethyl-N-m-toluidino)ethanol, 2,2'-(4-methylphenylimino)-diethanol, tris[2-(2-methoxyethoxy)ethyl]amine, 3-(dibenzylamino)-1-propanol, N-vinyl caprolactam, N-vinyl phthalimide, 9-vinyl carbazole, N[3-(dimethylamino)propyl]methacrylamide or mixtures thereof.

The reaction between the nucleophile and the halogenated butyl rubber polymer may be carried out at a temperature in a range of from about 60° C. to about 250° C. In one embodiment, the reaction between the nucleophile and the halogenated butyl rubber polymer may be carried out at a temperature about 80° C. to about 200° C. In another embodiment, the reaction between the nucleophile and the halogenated butyl rubber polymer may be carried out at a temperature about 100° C. to about 160° C. The reaction may be carried out for a time in a range of from about 0.5 to 90 minutes, preferably from 1 to 60 minutes, more preferably from 5 to 30 minutes. The amount of nucleophile reacted with the halogenated butyl rubber polymer may be in the range of from 0.01 to 5 molar equivalents, more preferably about 0.1 to 2 molar equivalents, even more preferably about 0.5 to 1 molar equivalents, based on the total molar amount of allylic halide present in the halogenated butyl rubber polymer. The resulting butyl rubber ionomer preferably possesses from about 0.01 to 10 mol %, more preferably from about 0.1 to 5.0 mol %, even more preferably from about 0.5 to 0.8 mol % of ionomeric moieties. The resulting butyl rubber ionomer may be a mixture of the polymer-bound ionomeric moiety and allylic halide such that the total molar amount of ionomeric moiety and allylic halide functionality are present in an amount not exceeding the original allylic halide content.

Compounding and Shaping

In an embodiment, the thermoplastic is blended with the butyl rubber ionomer at a temperature of 300° C. or less to disperse the butyl rubber ionomer in a matrix of the thermoplastic. Blending is preferably performed at a temperature above the melting temperature of the thermoplastic.

Ingredients may be blended together using conventional mixing techniques. Suitable techniques include, for example, mixing the ingredients using a batch mixer, a two roll mill, an internal mixer or various types of a continuous mixers. Either a single or twin screw extruder may also be employed which provide effective mixing with shorter mixing times. Twin screw extruders may include modular co-rotating twin screw extruders, or modular counter-rotating twin screw extruders. The mixing may be carried out for a time in a range of from about 0.25 to 30 minutes, preferably from 0.5 to 20 minutes, more preferably from 1 to 10 minutes. The ingredients may be dosed into the extruder using various feeders/stuffers which may include single and twin screw feeders, rotary feeders, belts feeders, vibratory feeders which can be controlled by either volume or weight. Liquids may be introduced directly into the mixing chamber where needed. Extruders are preferred. It is possible to carry out the mixing in two or more stages, and the mixing can be done using different types of mixing equipment in series for example mixing can be performed using an internal mixer followed by an extruder.

The blended material may be finished in a variety of ways including pelletizing (die-face, dry-cut or underwater), dicing, granulation, in sheets strips, lumps, and slabs which can be achieved via cast film extrusion, blown film extrusion, sheet extrusion, coextrusion, wire coating, or pipe and tubing extrusion, Additionally, the blended material may be injection molded via, for example, a two-plate or three-plate or stacked mold or the material may be compression molded using a hand, semiautomatic or fully automatic mold or the material may be transfer molded via, for example, transfer-in compression molding, plunger molding, or screw transfer molding. Additionally, the blended material may be blow molded by, for example, injection, stretch, dip blow multi-block, or coextrusion, sequential extrusion blow molding or the material may be molded by rotational molding using, for example, a batch system, carousel machine, shuttle machine, or clamshell machine. Additionally, the blended material may be finished as a foam material or calendered or welded. For further information on compounding techniques, see Encyclopedia of Polymer Science and Engineering, Vol. 4, p. 66 et seq. (Compounding) as well as Handbook of Thermoplastic Elastomers, 2007 Other techniques, as known to those of skill in the art, are further suitable for compounding.

It is preferable that the viscosities of the thermoplastic and butyl rubber ionomer are closely matched at the mixing temperature and the shear rate of the mixer or extruder. In an embodiment, the thermoplastic and butyl ionomer have viscosities within about 15% of each other, or more preferably within about 10% of each other (i.e. a viscosity ratio of about 0.9), in which case, the blending may be performed without the addition of plasticizer. In another embodiment, a plasticizer may be added to the butyl rubber ionomer prior to mixing to more closely match the viscosities, for example to change the viscosity of the butyl rubber ionomer to within 10% of the viscosity of the thermoplastic. In a preferred embodiment, no plasticizer is added to viscosity match the thermoplastic and butyl rubber ionomer. Sufficient dispersion of the butyl rubber ionomer in the thermoplastic may be obtained and the blend maintains good physical properties, particularly elongation and damping, despite the absence of a plasticizer.

Stabilizers, anti-oxidants, tackifiers, and/or other additives known to those of skill in the art may also be added to the blend in the usual way and in the normal amounts. Antioxidants may be either primary antioxidants (such as hindered phenolics or secondary aromatic amines) or secondaty antioxidants (such as phosphites and thioesters). Additionally, other additives may be added to the ionomer prior to blending with the thermoplastic and include light stabilizers nucleating agents, flame retardants, colorants, antistatic agents, slip agents, antiblocking agents, processing aids, fillers and reinforcements. Light stabilizers may include UV absorbers, UV quenchers, or free radical scavengers. Nucleating agents may include inorganic additives (such as talc, silica and clay), organic compounds (such as salts of mono- or polycarboxylic acids and certain pigments), or polymers (such as ethylene/acrylic esther copolymers). Flame retardants may include intumescent systems or those that act in the condensed phase or the gas phase. Colorants may include dyes (organic compounds that are soluble in the plastic) or pigments (insoluble in the plastic and may be inorganic or organic) Antistatic agents, commonly known as antistats, may be ionic or non-ionic and may be internal or external antistats. Slip agents may include modified fatty acids. Antiblocking agents may include natural and manufacturing waxes, metallic salts of fatty acids, silica compounds or polymers. Process aides may include lubricants or fluoro-polymer-based additives. Fillers and reinforcements may include inactive or active fillers and may include cubic or spheroidal fillers such as carbon black, calcium carbonate barium sulfate, glass beads, ceramic beads, synthetic silica, as well as platy fillers such as talc, mica, kaolin and clay or fibrous fillers such as glass fillers, carbon fibers, or aramid fibres as well as nanofillers. Plasticizers may include phthalic esters, phosphoric esthers, adipic esters, azelaic esters, sebacic esthers, citric esters, trimellitic esters, halogenated hydrocarbons, hydrocarbons (aliphatic, naphtenic, and aromatic), benzoic esters, fatty acid esters (oleates, stearates, ricinoleates), fatty esters, polyesters and polymers and polycondensates. Other additives may include antimicrobials, fluorescent whitening agents, and heat stabilizers.

Any article of manufacture amenable to be formed from a thermoplastic material may be made using the blend of the present invention. Applications may include adhesives, sealants, coatings, modified asphalt, automotive applications, hoses, tubes, sheets, mechanical rubber goods, consumer goods, architectural good, construction goods, electrical goods, electronic goods, medical and food contact goods, seals, gaskets, valve seats, bushings, grommets, appliance feet, caster wheels, torque couplings, vibration isolators, suction cups, caps, rollers, extruded profiles, bumpers, housings, bellows, shields, toys, ski pole grips, foamed profiles, sheets, wire and cable, mechanical goods. Some articles of manufacture include detergent, bottles (e.g. milk and juice bottles), cutting boards, water pipes, molded plastic cases, garden furniture, rope, fibers, carpets, sports equipment, bristles, low strength machine parts, seat belts, tire cords, pipes (e.g. for plastic pressure pipe systems), storage containers, bottle caps, appliances (e.g. kettles), car fenders (e.g. bumpers), door handle seals, floor mats, seals, handles, stamps, power cords, plugs, knobs, toothbrush handles, soft shoe inserts, phone cases, coolers, cases, pen cases, grips, sporting equipment, wires, expansions joints, roofing, flooring, weather seals, electrical connectors, plugs and insulators for electrical anc electronic assemblies, computer hardware, telephones, electronic appliances, office equipment, drug vial stoppers, syringe plunger tips, aerosol valve seals, medical tubing, liquid dispenser pimp diaphragms, nursing bed sheets, bumper covers, bumper caps, bumper side cladding, body molding, air dams, airing pieces, fender liners, rocker panel covers, rub strips, scuff plates, sight shields, stone deflectors, wheel well moldings, grills, valence panels, heating ari ducts, conduits, hoods seals, firewall pads, air bag covers, instrument panels, knee bolsters, glove box doors, door panels, door inserts, flexible cords, battery booster cables, appliance wires, low voltage wire, control cables, hook-up wire, submersible pump cable, cable jackets, transmission belts, timing belts, shock absorbers, membranes, conveyor belts, housewares, recreational goods, luggage handles, shoe soles, musical instruments, garden hose, spatulas, tapes, hot melt adhesives, coated fabrics, steering wheels, boots, bellows, dust covers,grips of tools, grips of sporting equipment, belts, valves, diapers, surgical garments, push buttons, parts of instruments, parts of hand-held devices, irrigation systems, agricultural equipment, keypads, seismographic cable, audio wire, camera cable, computer cable, head-set cable, marine cable, welder cable, air gun cable, communication wire, towing leader, wheels and castors for shipping carts, food service carts, wheels for inline skates, wheels for skateboards, coatings for inflatable boats, coatings for collapsible canoes, coatings for life rafts, life jackets, shoe lacquers, inks, leather coatings, magnetic tape, gel seats, cathertersm medical tubing, switches, connectors, and fibre optic coatings. Articles may be formed from the polymeric compound by any suitable shaping method, for example molding, die cutting, stamping, etc. as described above.

EXAMPLES

Materials and Methods

The butyl rubber ionomer used in these examples is X Butyl™ I4565P available from LANXESS Corporation. The high density polyethylene (ET326320) was obtained from Goodfellow, having a $T_m$ of 130° C. The low density polyethylene (A-C® 617) was obtained from Honneywell, having a $T_m$ of 110° C. The nylon 12 (Nylon 12) was provided by EMS-GRIVORY, having a $T_m$ of 180° C. The polypropylene (PP) was provided by Safripol, having a $T_m$ of 180° C.

Tensile properties were prepared using DIN 53504 S2 samples size and a pull rate of 500 mm/min extension rate according to ASTM D 412.

Elastic modulus is determined by using a GABO Eplexor® 150N using 12×4×2 mm samples and testing at 1% static strain, 0.1% dynamic strain at a heating rate of 2 ° C./min.

Atomic Force Microscopy (AFM) imaging was performed on by analysing the surface of samples created by freeze-fracturing the sample immersed in liquid nitrogen for ~5 minutes. The surface was imaged using the dynamic force mode of a Park Systems XE-100 AFM. A silicon cantilever with a nominal spring constant of 40 N/m, resonant frequency of 300 kHz and tip radius of 10 nm was used. The phase shift angle (phase difference between the piezo driver signal and the oscillation of the cantilever as detected by the photodetector) of the dynamic force mode AFM is sensitive to tip-sample interaction. A smaller phase shift angle (i.e., darker contrast in the phase image) suggests a softer component and a larger phase shift angle (brighter contrast) suggests a more rigid component.

Compounding of thermoplastic and Butyl ionomer to form blends was performed using a DSM Micro Compounder at a shear rate of 2000 $sec^{-1}$.

Examples 1-5

Figure 1B:
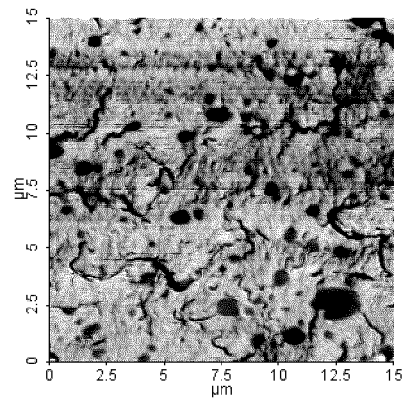
FIG. 1B is an atomic force microscope (AFM) image of a blend of low density polyethylene (LDPE) and butyl rubber ionomer mixed at 160° C. showing domains of butyl ionomer (dark regions) dispersed in a LDPE matrix (light regions).
Figure 1C:
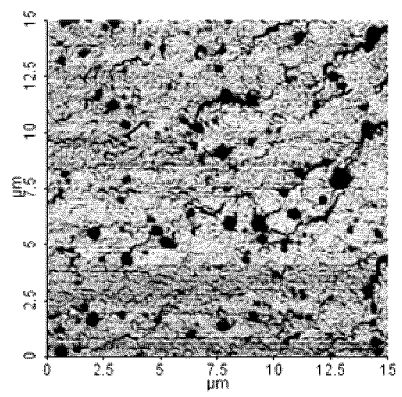
FIG. 1C is an atomic force microscope (AFM) image of a blend of low density polyethylene (LDPE) and butyl rubber ionomer with oil mixed at 130° C. showing domains of butyl ionomer (dark regions) dispersed in a LDPE matrix (light regions).
Figure 1D:
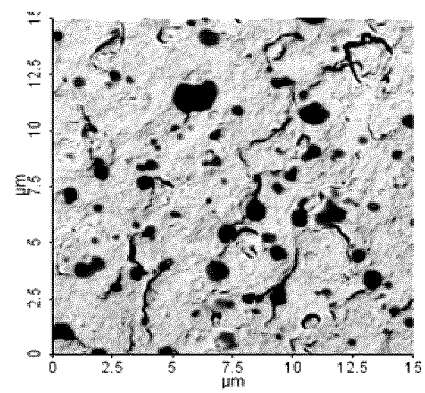
FIG. 1D is an atomic force microscope (AFM) image of a blend of low density polyethylene (LDPE) and butyl rubber ionomer with oil showing domains of butyl ionomer (dark regions) dispersed in a LDPE matrix (light regions).
Figure 1E:
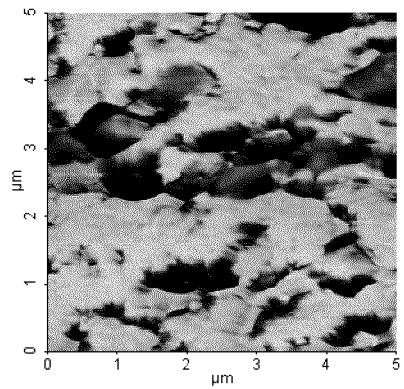
FIG. 1E is an atomic force microscope (AFM) image of a blend of high density polyethylene (HDPE) and butyl rubber ionomer with oil showing domains of butyl ionomer (dark regions) dispersed in a HDPE matrix (light regions).
Figure 1F:
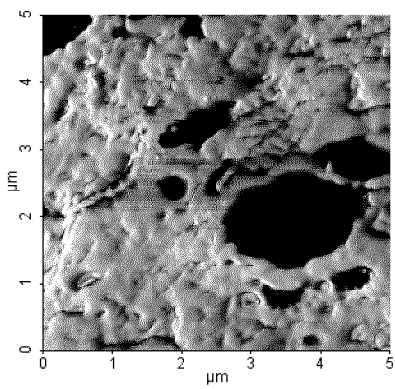
FIG. 1F is an atomic force microscope (AFM) image of a blend of nylon and butyl rubber ionomer with oil showing domains of butyl ionomer (dark regions) dispersed in a nylon matrix (light regions).

LDPE (100 or 90 phr) was mixed with X_Butyl™ I4565P (0 or 10 phr) in a twin screw extruder at either 130° C. or 160° C. for 1 min and 3 min. The viscosity ratio at 2000 $s^{-1}$ was 1.5 at 130° C. and 1.2 at 160° C. The resulting tensile properties and dynamic properties are summarized in Table 1. Addition of X_Butyl™ I4565P led to compounds with higher elongation. FIG. 1 demonstrates butyl ionomer domains (dark areas) in a plastic matrix (light area) where the domain sizes for Example 2 are <5 µm (FIG. 1A) and those for Example 4 are <3 µm (FIG. 1B).

TABLE 1

| Example | 1 | 2 | 3 | 4 | 5 |
|---|---|---|---|---|---|
| X_Butyl ™ I4565P (wt %) | 0 | 10 | 10 | 10 | 10 |
| LDPE (wt %) | 100 | 90 | 90 | 90 | 90 |
| Mixing Temperature (° C.) | 130 | 130 | 130 | 160 | 160 |
| Mixing Time (min) | 1 | 1 | 3 | 1 | 3 |
| Ultimate Tensile (MPa) | 16 | 11.7 | 11.8 | 11.4 | 10.9 |
| Ultimate Elongation (%) | 59 | 77 | 89 | 97 | 92 |

Examples 6-7

LDPE (90 phr) was mixed with 10 phr of X_Butyl™ I4565P that contained 10 phr Sunpar 2280 in a twin screw extruder at either 130° C. or 160° C. for 1 min and 3 min in order to better match the viscosity of the LDPE. The resulting viscosity ratio at 2000 s$^{-1}$ was 1.0 at 130° C. and 0.9 at 160° C. The resulting tensile properties and dynamic properties are summarized in Table 2. Addition of X_Butyl™ I4565P led to compounds with comparable elongation to Examples 2 and 5 above which contained no oil. FIG. 1 demonstrates butyl ionomer domains (dark areas) in a plastic matrix (light areas) where the domain sizes for Example 6 are <2 µm (FIG. 1C) and those for Example 7 are <3 µm (FIG. 1 D).

TABLE 2

| Example | 1 | 6 | 7 |
|---|---|---|---|
| X_Butyl ™ I4565P (wt %) | 0 | 9.9 | 9.9 |
| Sunpar 2280 (wt %) | 0 | 0.1 | 0.1 |
| LDPE (wt %) | 100 | 90 | 90 |
| Mixing Temperature (° C.) | 130 | 130 | 160 |
| Mixing Time (min) | 1 | 1 | 1 |
| Ultimate Tensile (MPa) | 16 | 11.8 | 10.9 |
| Ultimate Elongation (%) | 59 | 80 | 100 |

Example 8 and 9

Figure 2A:
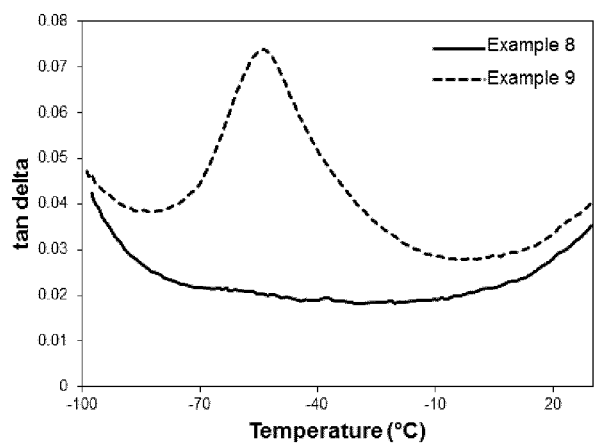
FIG. 2A is a graph of tan delta vs. temperature (°C.) showing damping responses for Examples 8 and blend Example 9.

Example 9 was formed by mixing HDPE (85 phr) with 15 phr of X_Butyl™ I4565P in a twin screw extruder at 130° C. The resulting viscosity ratio at 2000 s$^{-1}$ was 0.97 s$^{-1}$ when compared to Example 8 (100 phr HDPE). The resulting tensile properties and dynamic properties are summarized in Table 3. Addition of X_Butyl™ I4565P led to compounds with longer elongation and lower tensile. As seen in FIG. 1 E, the butyl ionomer forms discrete ionomer domains (dark areas, <2 µm in diameter) dispersed in an HDPE matrix (light area). As seen in FIG. 2A, the blend shows significant improvement in damping across a wide temperature range.

TABLE 3

| Example | 8 | 9 |
|---|---|---|
| X_Butyl ™ I4565P (wt %) |  | 15 |
| HDPE (wt %) | 100 | 85 |
| Ultimate Tensile (MPa) | 6 | 11 |
| Ultimate Elongation (%) | 63 | 54 |

Example 10 -12

Figure 2B:
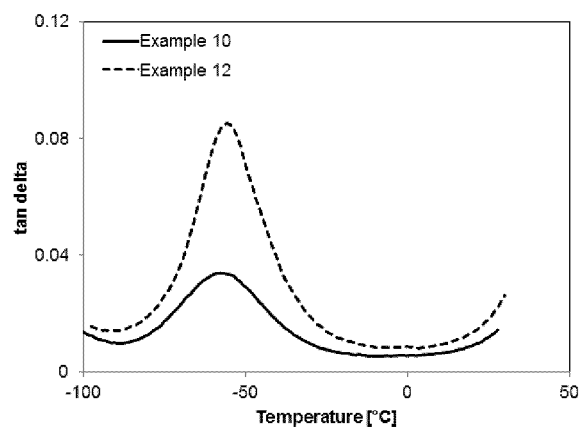
FIG. 2B is a graph of tan delta vs. temperature (°C.) showing damping responses for Example 10 and blend Example 12.

Example 11 was formed by mixing Nylon 12 (85 phr) with 15 phr of X_Butyl™ I4565P in a twin screw extruder at 180° C. The resulting viscosity ratio at 2000 s$^{-1}$ was 1.24 s$^{-1}$ when compared to Example 10 (100 phr Nylon 12). Example 12 was formed by the addition of oil to the butyl ionomer which served to improve the viscosity ratio to 1.0. The resulting tensile properties and dynamic properties are summarized in Table 4. Addition of the butyl ionomer led to compounds with longer elongation and comparable tensile strength. As seen in FIG. 1 F, forms discrete ionomer domains (dark area, <2 µm in diameter) dispersed in a Nylon 12 matrix (light area). As seen in FIG. 2B the blend (Example 12) shows significant improvement in damping across a wide temperature range.

TABLE 4

| Example | 10 | 11 | 12 |
|---|---|---|---|
| X_Butyl ™ I4565P (wt %) |  | 15 | 14.25 |
| Nylon 12 (wt %) | 100 | 85 | 85 |
| Sunpar 2280 |  |  | 0.75 |
| Ultimate Tensile (MPa) | 43 | — | 46 |
| Ultimate Elongation (%) | 122 | — | 229 |

Example 13-15

Figure 2C:
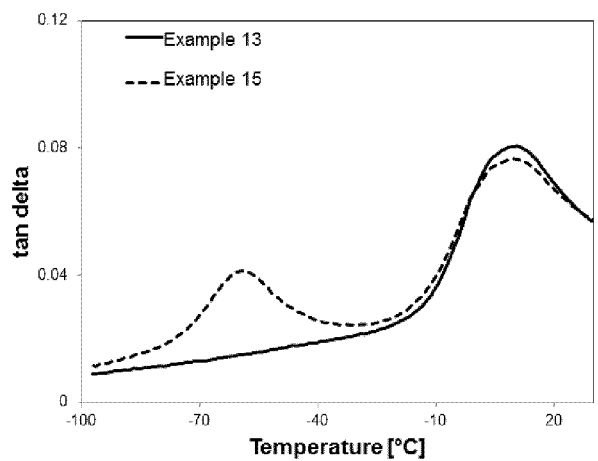
FIG. 2C is a graph of tna delta vs. temperature (°C.) showing damping responses for Example 13 and blend Example 15.

Example 14 was formed by mixing polypropylene (85 phr) with 15 phr of X Butyl™ I4565P in a twin screw extruder at 180° C. The resulting viscosity ratio at 2000 s$^{-1}$ was 1.54 s$^{-1}$ when compared to Example 13 (100 phr polypropylene). Example 15 was formed by the addition of oil to the butyl ionomer which served to improve the viscosity ratio to 1.0. The resulting tensile properties and dynamic properties are summarized in Table 5. Addition of the butyl ionomer led to compounds with longer elongation and comparable tensile strength. Atomic force microscopy shows discrete ionomer domains (dark areas, <2 µm in diameter) dispersed in a polypropylene matrix (light area). As seen in FIG. 2C the blend (Example 15) shows improvement in damping across a wide temperature range.

TABLE 5

| Example | 13 | 14 | 15 |
|---|---|---|---|
| X_Butyl ™ I4565P (wt %) |  | 15 | 13.5 |
| Nylon 12 (wt %) | 100 | 85 | 85 |
| Sunpar 2280 |  |  | 1.5 |
| Ultimate Tensile (MPa) | 45 | — | 36 |
| Ultimate Elongation (%) | 23 | — | 193 |

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A polymeric compound comprising a blend, the blend comprising:
    50 wt % or greater of a thermoplastic polymer having an average melting point ($T_m$) of less than 300° C.; and
    less than 50 wt % of an ionomer dispersed in a matrix of the thermoplastic polymer, the ionomer having phosphorus-based or nitrogen-based ionic moieties and comprising a copolymer derived from at least one isoolefin monomer and at least one multiolefin monomer,
based on the total weight of the blend.

2. The polymeric compound according to claim 1, wherein the thermoplastic polymer has a $T_m$ of 250° C. or less.

3. The polymeric compound according to claim 1, wherein the thermoplastic polymer has a $T_m$ of 185° C. or less.

4. The polymeric compound according to claim 1, wherein the blend comprises 75-99 wt % of the thermoplastic polymer and 1-25 wt % of the ionomer.

5. The polymeric compound according to claim 1, wherein the blend comprises 85-90 wt % of the thermoplastic polymer and 10-15 wt % of the ionomer.

6. The polymeric compound according to claim 1, wherein the blend does not comprise a compatibilizer for compatibilizing the thermoplastic polymer and the ionomer.

7. The polymeric compound according to claim 1, wherein the ionomer is dispersed in the thermoplastic polymer matrix as domains having an average diameter of about 5 μm or less.

8. The polymeric compound according to claim 1, further comprising a plasticizer.

9. The polymeric compound according to claim 1, wherein the thermoplastic polymer comprises a polyolefin or a polyamide.

10. The polymeric compound according to claim 1, wherein the thermoplastic polymer comprises polyethylene, polypropylene, polystyrene or nylon 12.

11. The polymeric compound according to claim 1, wherein:
the thermoplastic polymer comprises polyethylene, polypropylene, polystyrene or nylon 12 and has a $T_m$ of 185° C. or less;
the blend comprises 85-90 wt % of the thermoplastic polymer and 10-15 wt % of the ionomer;
the ionomer is dispersed in the thermoplastic polymer matrix as domains having an average diameter of about 0.1 to about 5 μm;
the blend does not include a compatibilizer for compatibilizing the thermoplastic polymer and the ionomer; and
the blend additionally comprises at least one of: plasticizers, stabilizers, anti-oxidants, tackifiers, nucleating agents, flame retardants, colorants, antistatic agents, slip agents, antiblocking agents, processing aids, fillers, reinforcements and curatives.

12. An article of manufacture comprising the polymeric compound as defined in claim 1.

13. The article according to claim 12, wherein the article is an adhesive, sealant, coating, article for automotive application, hose, tube, sheet, mechanical rubber good, consumer good, architectural good, construction good, electrical good, electronic good, medical and food contact good, seal, gasket, valve, bushing, grommet, appliance good, coupling, vibration isolator, cap, roller, extruded profile, bumper, housing, bellow, shield, toy, sporting good, foamed good, wire, cable, or mechanical good.

14. A process for producing a polymeric compound, the process comprising blending 50 wt % or greater of a thermoplastic polymer having an average melting point ($T_m$) of less than 300° C. with less than 50 wt % of an ionomer, the ionomer having phosphorus-based or nitrogen-based ionic moieties and comprising a copolymer derived from at least one isoolefin monomer and at least one multiolefin monomer, at a temperature of 300° C. or less but greater than the $T_m$ of the thermoplastic polymer, to disperse the ionomer in a matrix of the thermoplastic polymer, wherein the weights are based on total weight of the thermoplastic polymer and the ionomer.

15. The process according to claim 14, wherein the blending comprises blending in a mixer, a roll mill, an internal mixer, a continuous mixer, or a single or twin screw extruder.

16. The process according to claim 14, wherein the thermoplastic polymer and the ionomer have viscosities within about 10% of each other during blending.

17. The process according to claim 16, further comprising adding a plasticizer to bring the viscosity of the ionomer to within about 10% of the viscosity of the thermoplastic polymer.

18. The process according to claim 14, wherein 85-90 wt % of the thermoplastic polymer is blended with 10-15 wt % of the ionomer.

19. The process according to claim 14, wherein the thermoplastic polymer comprises a polyolefin or a polyamide.

20. The process according to claim 14, wherein the thermoplastic polymer comprises polyethylene, polypropylene, polystyrene or nylon 12.

* * * * *